(No Model.) 4 Sheets—Sheet 2.
J. HAY.
HARVESTER.
No. 330,978. Patented Nov. 24, 1885.
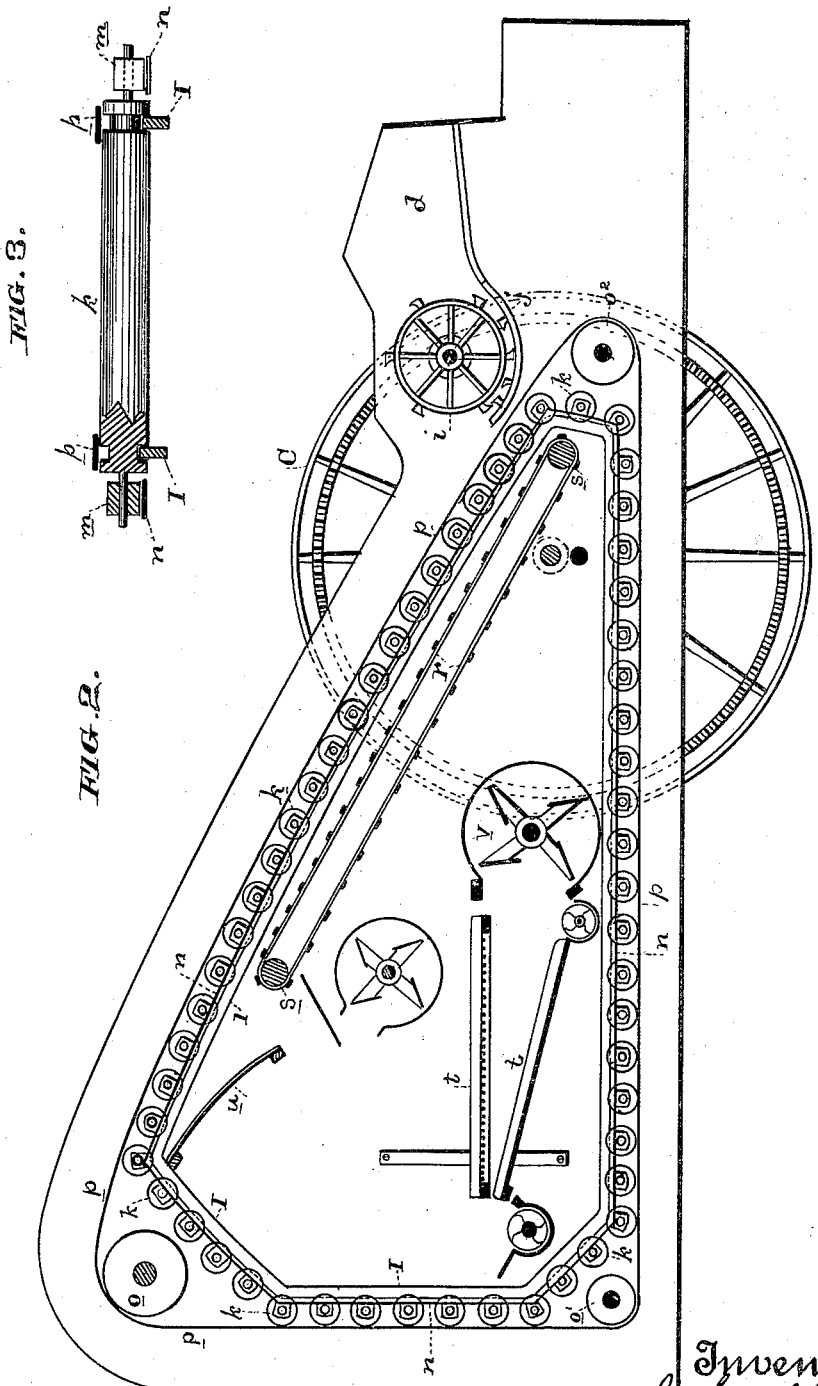
Witnesses
Geo. H. Strong
J. L. Towne
Inventor
John Hay
By
Dewey & Co
Attorneys (No Model.)  
4 Sheets—Sheet 3.
J. HAY.  
HARVESTER.
No. 330,978.  
Patented Nov. 24, 1885.
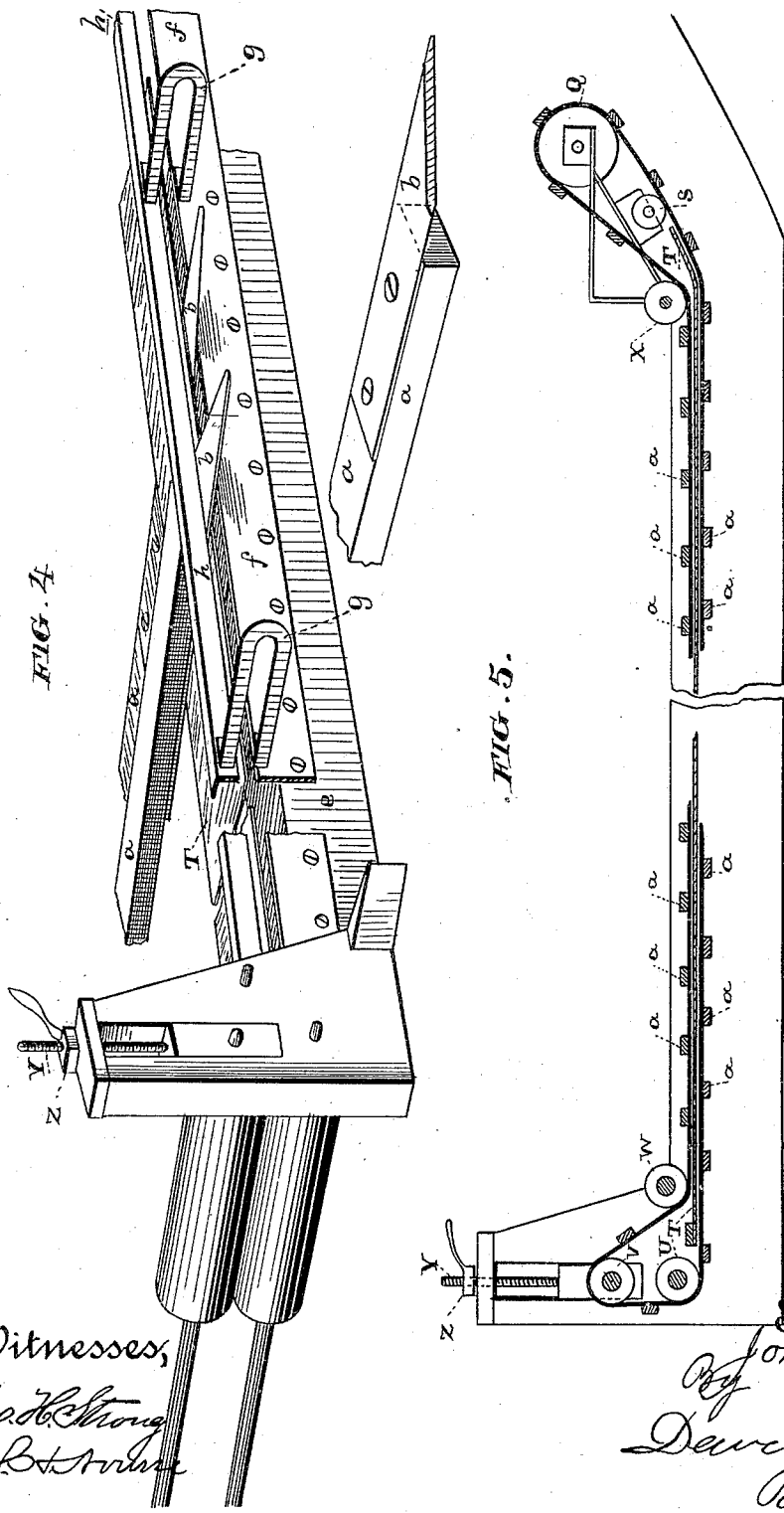

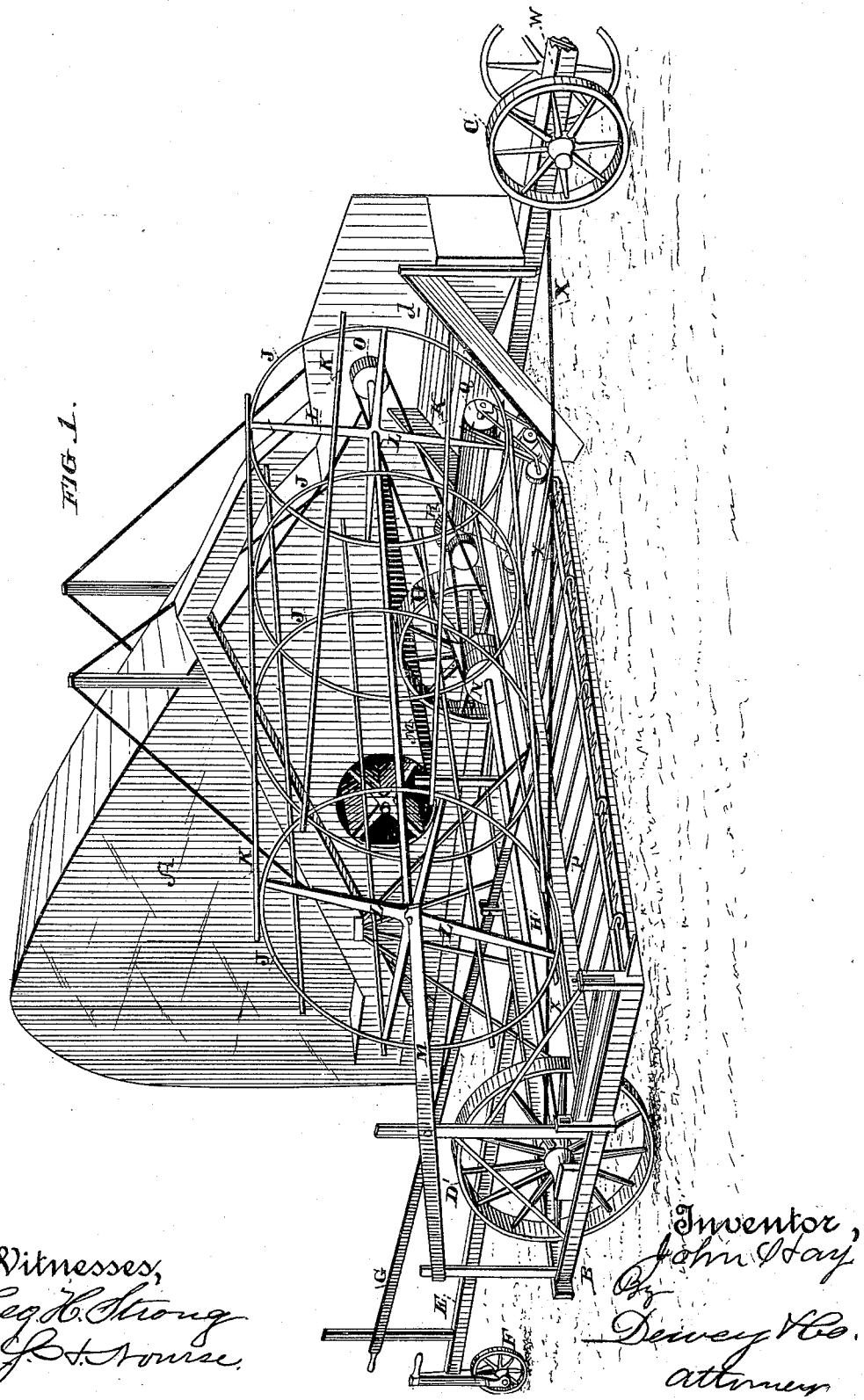

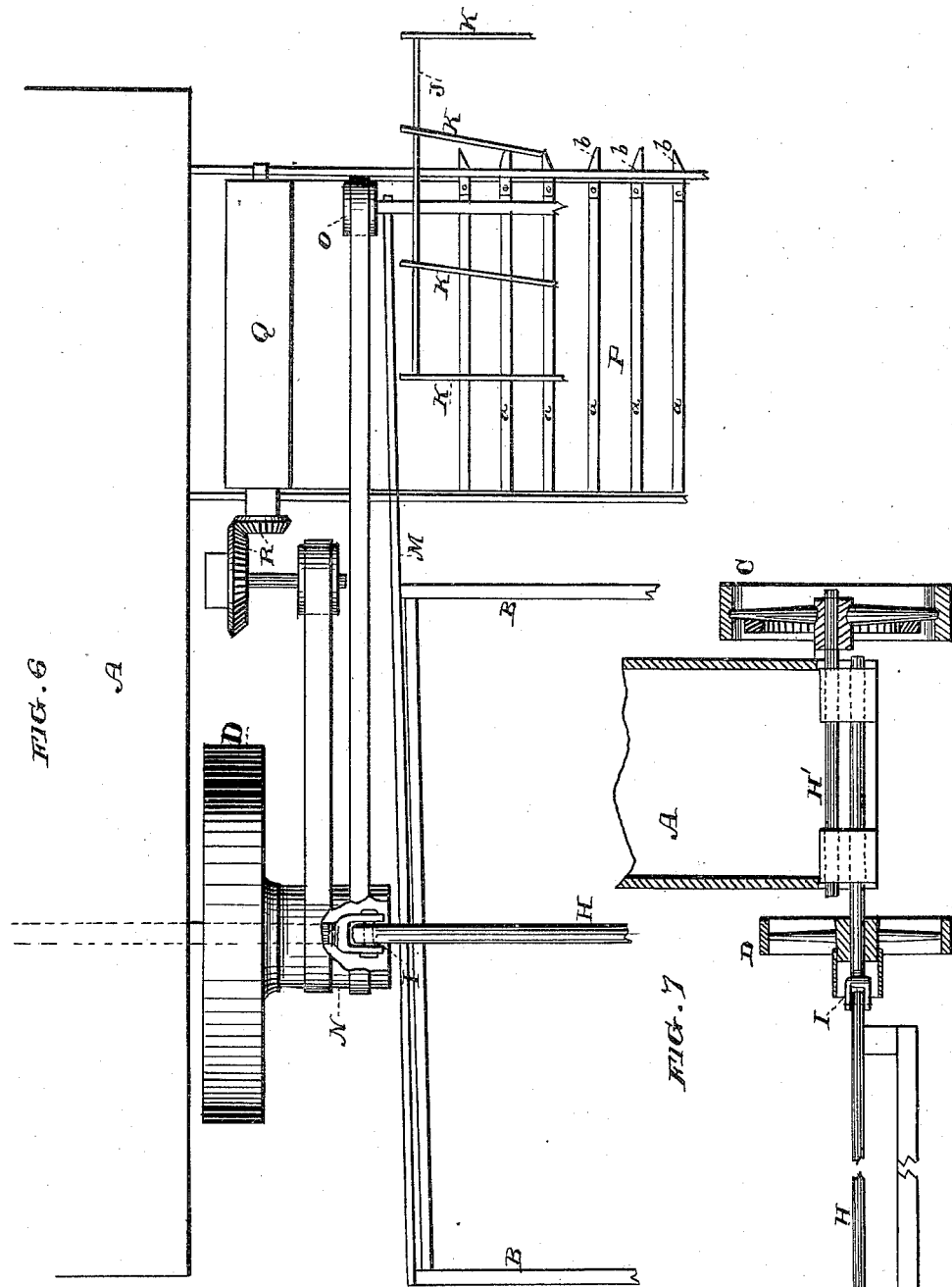

UNITED STATES PATENT OFFICE.

JOHN HAY, OF TRACY, CALIFORNIA.

HARVESTER.

SPECIFICATION forming part of Letters Patent No. 330,978, dated November 24, 1885.

Application filed August 30, 1884. Serial No. 141,876. (No model.)

*To all whom it may concern:*

Be it known that I, JOHN HAY, of Tracy, in the county of San Joaquin and State of California, have invented an Improvement in Harvesters; and I hereby declare the following to be a full, clear, and exact description thereof.

My invention relates to a harvesting-machine of that class in which the apparatus for heading or cutting the grain is combined with the thrashing and cleaning machinery, so as to be drawn about the field and cut, thrash, and clean the grain in a single continuous operation.

It consists of a header mounted upon bearing-wheels the axle or shaft of which extends directly through into the thrasher, which is supported at one side of the header, a joint-connection in said shaft, so that the independent movement of the header and thrasher over uneven ground will be provided for, and the two supported upon three wheels in line, and a draper or carrier belt upon which the cut grain falls, and by which it is delivered to the thrasher, said draper having a cutting mechanism attached to its front edge, a means for conveying the thrashed straw and grain upward and backward from the thrasher-cylinder and separating the grain from the straw, and in certain details of construction, all of which will be more fully explained by reference to the accompanying drawings, in which—

Figure 1, Sheet 1, is a perspective view of the apparatus. Fig. 2, Sheet 2, is a vertical longitudinal section taken through the thrashing and separating portion. Fig. 3 is a section showing one of the grooved rollers, guides, boxes, supporting and driving belts. Fig. 4, Sheet 3, is an enlarged perspective view of part of the front of the header, carrying-belt, tightener, cutter, and guides. Fig. 5 is a front view of the same, showing an edge view of the belt. Fig. 6, Sheet 4, is a plan view showing part of the header, the joint, reel, and driving-gears. Fig. 7 is a vertical transverse section, showing the relative arrangement of the header and thrasher supporting wheels.

A is the framing or housing within which the thrashing and separating mechanism is contained; and B is the frame-work of the header, which extends at right angles to the right from the front end of the thrasher portion, as shown. The thrashing portion of the apparatus is partly supported upon a wheel, C, and partly upon the wheel D, and the heading portion upon the wheels D D'.

E is a pole, to which may be attached the usual caster or steering wheel, F; and G is the lever by which the header is raised and lowered to accommodate the sickle to varying heights of the grain.

H is the shaft upon which the header-wheels D D' turn, and this shaft has a coupling or joint, I, made near its inner end, so that a portion which extends beyond the wheel D, nearest the thrasher portion of the mechanism, may extend directly into the thrashing-machine. The wheel C, upon the opposite side of the thrasher, carries the driving-gear for the thrasher, and is of larger diameter than the wheels D', so that its axle H' extends across the thrasher above the axle H, as shown in Fig. 7.

As the thrashing portion A is partly supported upon one wheel, C, and partly on the wheel D, and the heading portion B, which extends to a considerable distance to one side, is supported upon the wheels D D', it will be seen that the movements of the two will be irregular, by reason of the unevenness of the ground over which it may pass; and this coupling I, which is about in line with the joint between the two, allows of this irregularity without interfering with the uniting of the whole apparatus by this shaft.

The reel by which the grain is bent inward toward the sickle so as to be cut consists of circular hoops J, two at the ends and two or more at intervals between them, having the bars K extending across them from side to side in the usual manner. The end rings or hoops, J, have arms L, by which they are supported from the shaft, but the interior hoops do not have any arms, but their elasticity and rigidity is sufficient, together with the fact that they are secured to each of the bars K, to hold these bars in position without any other support between their ends, and the reel is thus made very light and rigid. The reel is raised or lowered and adjusted by means of the arms M, in which the ends of the reel-shaft are journaled or supported.

N is a pulley upon the wheel D, and a belt from this pulley to a pulley, O, on the end of the reel-shaft serves to rotate the latter when the machinery is in motion.

P is the grain-carrier belt, which moves horizontally across the header so as to carry the grain which falls upon it toward the thrashing portion of the apparatus. This belt has a pulley, Q, over which it passes at the end nearest the thrashing apparatus, and bevel-gears R drive it, being themselves driven from a pulley upon the bearing-wheel D by means of a belt, as shown. The lower part of this belt or grain-carrier P passes downward from the driving-pulley beneath the roller or pulley S, which guides it so that it passes beneath the plate T, which is bent, and the lower portion of the belt passes horizontally across the header-frame to a guide-pulley, U, around which it passes, thence upward around the pulley V, and then again downward, so that its edges pass beneath the yielding guide-pulleys W, whence it passes horizontally across the frame just above the plate T and in close proximity with the lower part of the belt to the opposite side, where its edges pass beneath the narrow yielding guiding-pulleys X, whence it passes up over the driving-pulley Q. The tension of this belt is regulated and maintained by a screw, Y, with a nut, Z, by which it may be operated, and the pulley V, over which the draper passes at the outer end, is journaled in a movable frame, so that by means of the screw Y and nut Z it may be raised or lowered so as to regulate the tension of the belt or draper, as may be desired. This belt or draper has transverse slats or bars $a$ extending across it at suitable intervals, and the cutters or knives $b$ are bolted upon the front ends of these transverse strips, or are otherwise secured to the belt, so that as the upper and lower parts of the belt pass each other close together these cutting-blades will pass each other in the manner of the blades of a pair of shears. The ends of these blades are beveled in the direction in which they will pass each other, or, as shown at $b$, so as to produce a shearing cut, and when the draper is in motion it serves to receive the grain as fast as it is cut and carry it to the delivery end of the apparatus, from which it falls into the space $d$ of the thrashing apparatus.

To the front timber, $e$, of the header-frame a plate, $f$, is bolted and extends upward, so that the cutting-blades $b$, which project from the front of the lower portion of the traveling belt, move between the upper edge of this plate $f$ and the horizontal plate T. Yokes $g$ have the lower end fixed to the plate $f$ or timber $e$, and extend outward and curving back, so that the upper portion extends backward over the lower portion. The upper end is bolted to a plate, $h$, which extends vertically above the plate $f$, and is supported by the yokes $g$, of which there may be as many as may be necessary across the front of the header. This plate $h$ serves as an upper guide for the cutters $b$, which project outward from the upper portion of the traveling belt, while the edge of the horizontal plate T, which extends outward between the two parts, projects slightly to the front of the adjacent edges of $h$ and $f$, so that each of the oppositely-moving knives or cutters which are attached to the front edge of the traveling belt move in the slots between these plates $f$, T, and $h$, and are guided thereby, so as to always pass each other closely enough to produce a clean cut. The straw which falls upon the upper portion of this traveling belt or draper is carried upward at the end, and discharged, as before described, into the thrashing portion at $d$, from which point it is fed to the thrashing-cylinder $i$, and, passing between it and the concave $j$, is thrashed in the usual way. In order to convey this thrashed straw and grain away from the cylinder as fast as it is delivered, I employ an endless belt of rollers, which may be either smooth, corrugated, or toothed, with suitable means for causing them to move upward and backward, so as to carry the straw upon their upper surface and agitate it sufficiently to loosen and separate the grain from it. Beneath this roller-belt is a tight belt, of canvas or other suitable material, upon which the grain falls and by which it is carried upward to the point where it is to be discharged into the cleaning-shoe. The rollers $k$, which form this straw-carrying belt, are grooved near their ends sufficiently deep so that they may travel upon guide-tracks $l$, which are fixed in the proper position for that purpose, and thus keep the rollers in their proper position. The shafts or axles of these rollers extend outward and turn in boxes $m$, which are supported upon belts $n$, to which they are fixed. These belts serve to retain the rollers at an equal distance apart, and the rollers move upon the guide-rails $l$, as before described. These guide rails or tracks are arranged in a triangular form similar to that shown in Fig. 2. In order to drive this roller-belt, I employ belts or bands $p$, which pass over driving and guiding pulleys $o$, $o'$, and $o^2$. The track $l$ where it passes up the incline from the point where it leaves the thrashing-cylinder toward the rear of the apparatus is curved, so as to produce a convex surface from one end to the other of this incline, so that the belts $p$ will press upon the outer ends of these rollers with sufficient friction to cause them to rotate and travel along upon the guide-rails $l$, thus moving them around the triangular line of travel as long as the machine is in operation. At the angles where the pulleys $o$, $o'$, and $o^2$ are situated the track $l$ is carried inside of these pulleys, so that the rollers $k$ will not be carried around these pulleys with the belts $p$, but will pass inside the pulleys, as shown in Fig. 2. $r$ is the grain-belt, passing around suitable guide and driving pulleys, $s$, at each end and extending up beneath the roller-belt before described, so that the grain which is separated from the straw and falls upon the grain-carrier $r$ will be delivered by it from the upper end, so as to fall upon the riddles of the cleaning-shoe $t$. $u$ is an incline extending downward from the upper end of this roller-belt and just beneath it, so as to bring back any grain which may be separated from the straw after it passes beyond the upper end of the grain-belt $r$.

The straw may be delivered from the upper end of the machine directly to the rear, or it may be delivered upon the transversely-moving belt, which will carry it off to one side and deliver it there instead of behind. The cleaning-shoe $t$ is provided with one or more blast-fans, $v$, which produce sufficient blast to clean the grain in the usual manner.

The whole apparatus is drawn by a team which is attached to a pole or timber, $w$, extending in front of the front supporting-wheels, $C'$, of the thrasher. A rod or bar, $x$, extends from the timber $w$ diagonally backward across the header-frame, and is secured to the rear outer end. This rod and the jointed shaft H serve to draw the header with the thrasher while allowing it freedom of motion to accommodate it to the unevenness of the ground.

I do not desire to prosecute in this case the harvester-reel herein shown, nor the features relating to the thrashing mechanism, but these features I desire to reserve to myself, as they may constitute the subject-matter of applications to be filed hereafter.

Having thus described my invention, what I claim as new, and desire to secure by Letters Patent, is—

1. A grain cutting or heading apparatus mounted upon wheels, a thrashing and cleaning apparatus connected with one end thereof, and having the outer side supported upon an independent wheel and the shaft or axle upon which the bearing-wheels of the header are fixed, said shaft having a universal joint and extending from the header into the thrashing portion of the apparatus, substantially as herein described.

2. In a harvesting and thrashing machine, the grain cutting or heading mechanism supported upon wheels having a tongue extending rearwardly therefrom, with steering-wheel and adjusting-lever, together with a thrashing and cleaning mechanism having one side supported upon the inner header-wheel and the other side upon an independent bearing-wheel, means for attaching a team to the thrasher, an axle upon which the header-wheels turn having a universal joint, and a rod extending diagonally across the header from the thrasher, whereby the header is preserved in proper working position, substantially as herein described.

3. In a harvesting apparatus, the horizontally-moving endless belt or draper upon which the cut grain falls, having cutting-knives secured to it and projecting from its front edge, together with guides between which said knives pass across the front of the machine in opposite directions and in close proximity to each other, substantially as herein described.

4. In a harvesting apparatus, an endless traveling belt or draper upon which the cut grain falls, knives or cutters secured to the front edge of this belt, projecting therefrom, upper and lower guide-plates, $h$ and $f$, between which and the central plate, T, these cutters move, together with the yokes $g$, by which the plates are held in position relative to each other, substantially as herein described.

5. In a harvesting apparatus, the endless traveling belt or draper upon which the cut grain falls and by which it is carried to the thrasher, knives or cutters secured to its front edge, and guides by which said knives are caused to pass each other in opposite direction in close proximity, driving and guiding pulleys around which the upper and lower portions of said endless belt pass, and a pulley, V, and mechanism by which the tension of the belt is regulated and adjusted, substantially as herein described 6. In a harvesting apparatus, a grain cutting or heading mechanism consisting of a frame supported upon bearing-wheels, an endless belt or draper upon which the cut grain falls, having knives or cutters which project from its front edge and pass each other in opposite directions in close proximity and between suitable guides, a thrashing and cleaning mechanism supported upon the inner header-wheel and an independent outside wheel and connected with the header so as to be propelled with it, an axle upon which the bearing-wheels of the header turn, said shaft being jointed and extending into the thrashing-machine, a receiver into which the straw is delivered from the traveling belt or draper, a thrashing-cylinder, straw and grain belt, and a cleaning-shoe, substantially as herein described.

In witness whereof I have hereunto set my hand.

JOHN HAY.

Witnesses:
C. M. WOOSTER,
PAUL J. CONKLING.